UNITED STATES PATENT OFFICE.

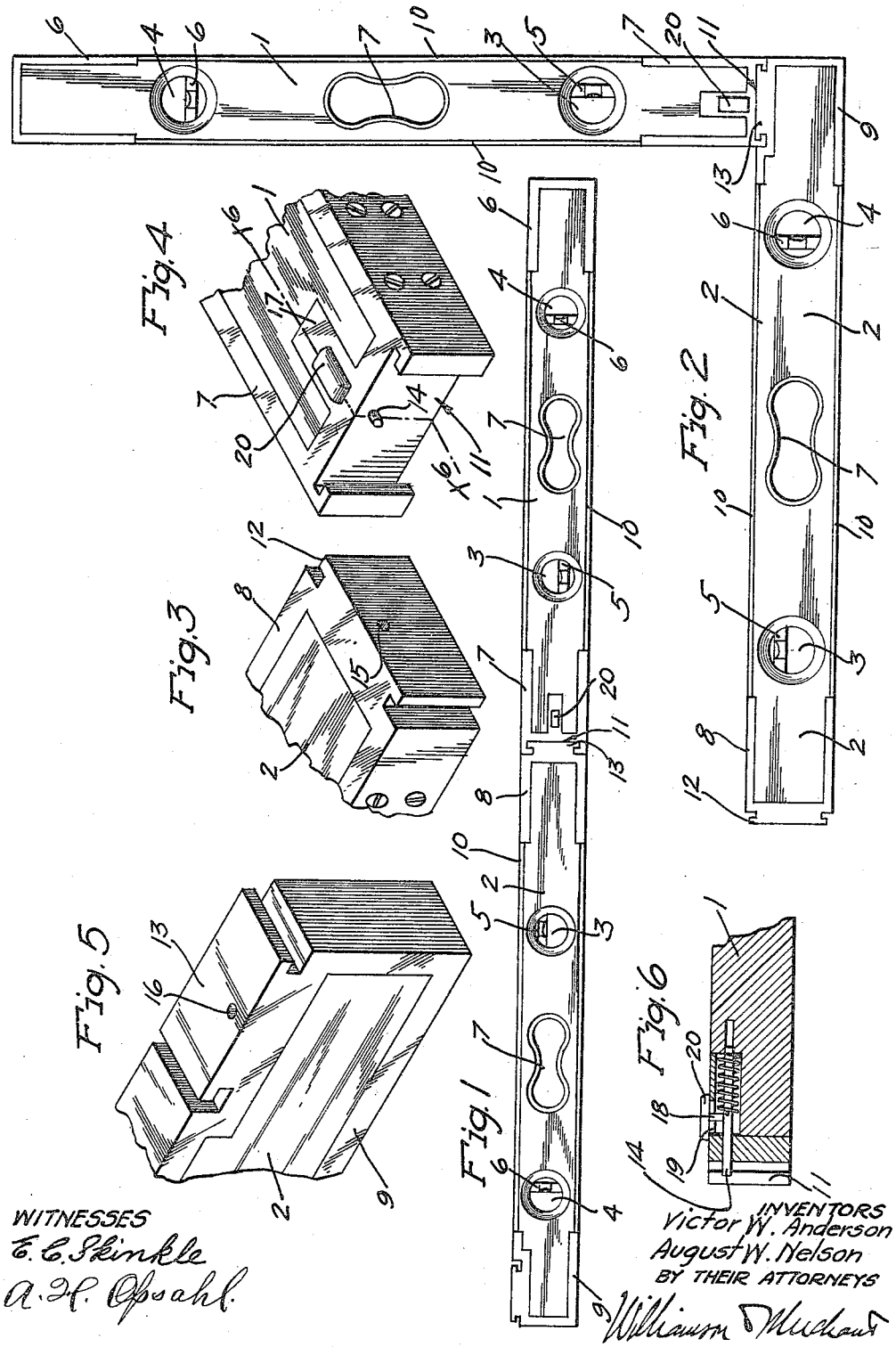

VICTOR W. ANDERSON AND AUGUST W. NELSON, OF MINNEAPOLIS, MINNESOTA.

LEVEL AND PLUMB.

1,182,730.  Specification of Letters Patent.  Patented May 9, 1916.

Application filed January 13, 1915. Serial No. 1,952.

*To all whom it may concern:*

Be it known that we, VICTOR W. ANDERSON and AUGUST W. NELSON, citizens of the United States, residing at Minneapolis, in the county of Hennepin and State of Minnesota, have invented certain new and useful Improvements in Levels and Plumbs; and we do hereby declare the following to be a full, clear, and exact description of the invention, such as will enable others skilled in the art to which it appertains to make and use the same.

Our invention relates to improvements in combined levels and plumbs, intended for general use but especially adapted for stone and brick masons.

To the above end, generally stated, the invention consists of the novel devices and combinations of devices hereinafter described and defined in the claim.

In the accompanying drawings, which illustrate the invention, like characters indicate like parts throughout the several views.

Referring to the drawings: Figure 1, is a side elevation of the body members connected in longitudinal alinement to afford a long level and plumb; Fig. 2, is a side elevation of the body members connected to afford a combined plumb, level and square; Figs. 3 and 4, are perspective detail views, showing the separable joint for detachably connecting the body members in longitudinal alinement, as shown in Fig. 1; Fig. 5, is a perspective view showing one member of the joint, which together with the joint member shown in Fig. 4, constitutes the joint for connecting the body members as shown in Fig. 2; and Fig. 6, is a detail view principally in section taken on the line $X^6 X^6$ of Fig. 4.

The numerals 1 and 2 indicate, respectively, rectangular wooden body members, each having formed therein, sight openings 3 and 4 in which are mounted the customary spirit level 5 and spirit plumb 6, respectively. Each body member 1 and 2 is also provided with the usual hand hold 7. As is evident, each body member and its glasses afford a relatively short mechanic's level and plumb which in itself is complete. The ends of the body members, 1 and 2, are tipped with metallic yokes 6—7—8 and 9 that are flush with the sides and edges of said body members. The longitudinal edges of the body members 1 and 2 are also bound with metallic strips 10.

To detachably connect the two body members 1 and 2 in longitudinal alinement, to afford a relatively long level and plumb which is necessary for stone and brick work, a joint is provided that is separable by a lateral movement of one of said body members in respect to the other. This separable joint, as shown, comprises a T-socket 11 and coöperating T-head 12 integrally formed with the transverse portions of the yokes 7 and 8, respectively.

To connect the body members 1 and 2, to afford a combined level, plumb and square, as shown in Fig. 2, is formed on one of the legs of the yoke 9 a T-head 13, which together with the T-socket 11 affords a separable joint. This joint 11—13, like the joint 11—12, is separable by a lateral movement of one of the body members with respect to the other.

The coöperating joint members 11—12 and 11—13 are held interlocked and against lateral separation by a spring pressed lock bolt 14, arranged to enter either an aperture 15 in the T-head 12 or an aperture 16 in the T-head 13. This lock bolt 14 is mounted in an inward extension 17, integrally formed with the transverse portion of the yoke 7, with its free end normally projecting into the T-socket 11. On the lock bolt 14 is a lateral stem 18 that works in a slot 19 in the extension 17. A thumb piece 20, by which the lock bolt 14 is moved against the tension of its spring, is secured to the outer end of the stem 18. This thumb piece is of such size as to cover the slot 19 in all positions of said thumb piece.

From the foregoing description it is evident that when the body members 1 and 2 are separated, each thereof may be used as a short level and plumb which is very desirable for use on some work. On the other hand when it is necessary or desirable to use a long level and plumb, the body members 1 and 2 may be readily connected in longitudinal alinement. It is important to note that when the body members 1 and 2 are connected, as shown in Fig. 1, the level glasses 5 are in reverse order so that one of said glasses is always in position to be read, no matter which edge of the level is turned up.

It will be noted that when the body members 1 and 2 are connected to form a square with the body member 1 in a horizontal position and the body member 2 projecting vertically thereabove, the level glass 5 of said body member 1 is in a position to be read. When the body member 2 is turned into a horizontal position with the body member 1 projecting vertically therebelow, the level glass 5 of said body member 2 is in a position to be read.

The above described invention, while very simple, affords a combination tool that is adapted for various kinds of work, and may be packed in a very compact form which makes it easy to carry or ship.

What we claim is:

A level comprising two body members, each having mounted thereon, a level glass and a plumb glass, one of said body members having a pair of duplicate lock elements, located at an angle to each other, and the other body member having a lock element, adapted to be interlocked with either lock element of the other body member for detachably connecting said two body members in longitudinal alinement, or at an angle to each other.

In testimony whereof we affix our signatures in presence of two witnesses.

VICTOR W. ANDERSON.
AUGUST W. NELSON.

Witnesses:
EVA E. KÖNIG,
HARRY D. KILGORE.

Copies of this patent may be obtained for five cents each, by addressing the "Commissioner of Patents, Washington, D. C."